United States Patent [19]

Stones et al.

[11] Patent Number: 4,784,034
[45] Date of Patent: Nov. 15, 1988

[54] SAW BLADES AND SAW ASSEMBLIES

[75] Inventors: Kevin Stones, Bishop Auckland; Malcolm J. Wootton, Wolsingham, both of England

[73] Assignee: Black & Decker Inc., Newark, Del.

[21] Appl. No.: 881,228

[22] Filed: Jul. 2, 1986

[30] Foreign Application Priority Data

Jul. 3, 1985 [GB] United Kingdom ............... 8516808
Jul. 3, 1985 [GB] United Kingdom ............... 8516809
Jul. 3, 1985 [GB] United Kingdom ............... 8516810

[51] Int. Cl.⁴ .................... B27B 11/02; B27B 33/02
[52] U.S. Cl. ........................... 83/852; 83/835; 83/821; 83/751; 30/292; 30/294
[58] Field of Search ............... 83/835, 852, 821, 751, 83/746, 848, 849, 851, 850, 854, 855; 30/392, 394

[56] References Cited

U.S. PATENT DOCUMENTS

| 810,530 | 1/1906 | Guedel . | |
| 1,537,980 | 5/1925 | Asselin | 30/392 |
| 2,224,867 | 12/1940 | Hechler | 83/852 |
| 2,784,751 | 3/1957 | Alexander | 83/821 X |
| 2,849,037 | 8/1958 | Wright | 83/852 |
| 4,423,553 | 1/1984 | Miyawaki . | |

FOREIGN PATENT DOCUMENTS

| 2510025 | 1/1983 | France | 30/392 |
| 707795 | 10/1980 | U.S.S.R. | 30/392 |

Primary Examiner—Donald R. Schran
Attorney, Agent, or Firm—Edward D. Murphy; Harold Weinstein; Edward D. C. Bartlett

[57] ABSTRACT

A saw blade assembly comprises a laminated structure of three side-by-side parallel strips, one two or all of which may have spaced teeth formed along one edge. Where only one strip has teeth, it is sandwiched between the two other strips and the teeth are of triangular shape when seen in plan and are bevelled on both edges to produce pointed tooth tips. Where two strips have teeth, the strips are arranged one on each side of a center strip. Again, the teeth are of triangular shape when seen in side elevation and are contoured to form pointed tips. The roots of the teeth on one strip are spaced laterally from the roots of the teeth on the other strip because of the presence of the center strip. In another form, each strip has teeth along one edge, the assembly thereby providing three parallel, side-by-side rows of teeth. The teeth are of triangular shape when seen in side elevation and are contoured to form pointed tips.

10 Claims, 6 Drawing Sheets

SAW BLADES AND SAW ASSEMBLIES

FIELD OF THE INVENTION

This invention relates to saw blades and saw blade assemblies and has particular although not exclusive reference to saw blades and assemblies for power saws.

BACKGROUND OF THE INVENTION

U.S. Pat. No. 2,784,751 describes a power saw with a saw blade comprising a three-piece laminated assembly. The laminations are of strip form with saw teeth along one edge thereof, each tooth being contoured to form a chisel edge at its tip. The centre strip is of reduced top-to-bottom dimension as compared with the outer strips thereby providing a longitudinal groove along the upper edge of the assembly in which locates the edge of a blade support and guide.

The assembly will not cut certain materials satisfactorily.

SUMMARY OF THE INVENTION

The present invention envisages a saw blade comprising a row of teeth spaced along the length of the blade, each tooth being of triangular form seen in side view and being bevelled on both edges to produce a pointed tooth tip, the bevels being formed on one face only of each tooth, and in which some at least of the teeth are outwardly set.

Successive teeth in the row may be bevelled on alternate faces.

The saw blade may be of laminar construction comprising an inner strip with the row of teeth and outer strips positioned to form a longitudinal channel along the upper edge of the blade and in which the set is such that the tooth points of the set teeth are laterally spaced apart by a distance slightly greater than the maximum width of the blade.

The teeth may be equi-spaced along the length of the blade.

The present invention also envisages a saw blade assembly having a cutting edge defined by only two parallel rows of spaced saw teeth extending longitudinally of the assembly, the roots of the teeth in one of the rows being spaced laterally from the roots of the teeth in the other row.

At least some of the teeth of the assembly referred to in the preceding paragraph in each row may be set outwardly.

In one embodiment of the invention, every tooth in both rows is set outwardly.

In another embodiment, the remaining teeth in both rows are set inwardly.

Each tooth may be of triangular form when seen in side elevation and is contoured to provide a pointed tooth tip.

Each tooth may be bevelled on at least one edge to provide the pointed tip.

Some at least of the teeth may be bevelled on both edges to provide the pointed tip.

The bevelling may be on one face of the tooth.

Some of the teeth may have a bevel or bevels on the inside face of the tooth while others may have a bevel on the outside face.

In one embodiment, the teeth in both rows have a bevel or bevels on their inside faces.

In another embodiment, alternate teeth in each row have a bevel or bevels on their inner faces, the remaining teeth having a bevel or bevels on their outside faces.

The teeth in each row may be arranged in pairs along the length of the assembly, each pair being separated from the next pair by a distance greater than that between the teeth of a pair.

One tooth of a pair may be bevelled on its inside face and set outwardly while the other tooth of the pair is bevelled on its outside face and set inwardly.

The teeth of one row may lie centrally of the spaces between the teeth of the other row.

Preferably, the assembly is of a laminar construction and may comprise a first outer strip with a row of spaced teeth along one edge, a second outer strip with a row of spaced teeth along one edge and an inner strip located between the first and second strips and which does not extend beyond the roots of the teeth in the rows.

The inner strip may be dimensioned to provide a longitudinal guide groove between the outer strips.

Alternatively, the inner strip may be dimensioned to provide a longitudinal guide projecting from the outer strips.

The assembly may have a tooth in at least one of the rows closely adjacent the forward end of the assembly. Alternatively, both rows may have teeth closely adjacent the forward end of the assembly.

The present invention further envisages a saw blade assembly having a cutting edge defined by three parallel rows of spaced teeth extending longitudinally of the assembly, each tooth being of triangular form when seen in side elevation and being contoured to provide a pointed tooth tip.

The invention also provides a saw blade assembly having a cutting edge defined by three parallel side-by-side rows of spaced teeth extending longitudinally of the assembly, the teeth of each of the outer rows being contoured on their inner faces to form pointed tooth tips, the teeth of the inner row also being contoured on at least one face to form pointed tooth tips.

Successive teeth of the centre row may be alternately contoured on one face and then on the other.

The contouring may comprise bevels on the edges of the teeth.

The teeth of the outer rows may be set outwardly.

The first tooth in at least one of the rows may be located closely adjacent the forward end of the assembly.

The assembly may be of a laminar construction which may comprise three strips each with a row of teeth along one edge thereof.

The strips may be so positioned relatively to each other in a manner such as to provide a longitudinal channel along the other edge of the assembly.

Alternatively, the strips may be positioned relatively to each other in a manner such as to provide a longitudinal channel along the other edge of the assembly.

The invention also provides a saw blade assembly having a cutting edge defined by three parallel rows of spaced teeth extending longitudinally of the assembly, each tooth being of triangular form when seen in side view and contoured to provide a pointed tooth tip, the leading tooth in at least one of the rows being closely adjacent the forward end of the assembly.

In one embodiment, each row may have its leading tooth closely adjacent the forward end of the assembly.

The invention also envisages a kit of parts comprising the saw blade or assembly and a power tool including a support for supporting and guiding the blade and a drive for reciprocating the blade to and fro along the support and in which the set is such that the tooth points of the set teeth are spaced apart laterally by a distance slightly greater than the maximum overall thickness of the support.

Alternatively, the kit of parts may comprise the saw blade or assembly and a support guide for the blade and in which the set is such that the tooth points of set teeth are spaced apart laterally by a distance slightly greater than the maximum width of the support guide.

The invention may also comprise a power saw comprising a support for supporting and guiding a saw blade or assembly, a saw blade or assembly mounted upon the support, and a drive for reciprocating the blade or assembly relatively to the support, and in which the set is such that the tooth points of set teeth are spaced apart laterally by a distance slightly greater than the maximum thickness of the blade support and guide.

In the case of the power saw, the support may comprise a longitudinal guide surface located in the longitudinal channel of a saw blade assembly of laminar construction.

The support may be of laminar construction and may comprise side-by-side members of which the inner member provides a guide surface along which the saw blade reciprocates.

Alternatively, the laminar construction of the support may comprise two side-by-side members contoured to provide a channel along the length of the support in which the saw blade or assembly reciprocates.

The laminar construction may alternatively comprise side-by-side members contoured to provide a longitudinal channel along the length of the support in which the saw blade or assembly reciprocates.

In another form, the laminar construction of the support comprises two side-by-side members, the longitudinal edge of one of which forms a tongue along which the saw blade or assembly reciprocates.

BRIEF DESCRIPTION OF THE DRAWINGS

By way of example only, embodiments of the invention will now be described in greater detail with reference to the accompanying drawings in which.

DETAILED DESCRIPTION OF THE PREFERRED EMBODIMENTS

Figure 1:
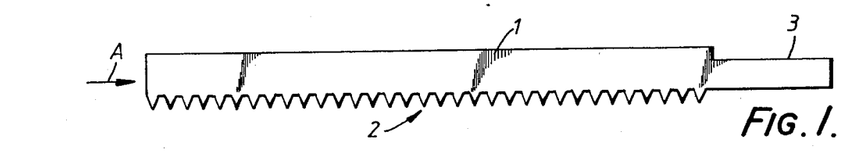
FIG. 1 is a side view of a first embodiment.
Figure 2:
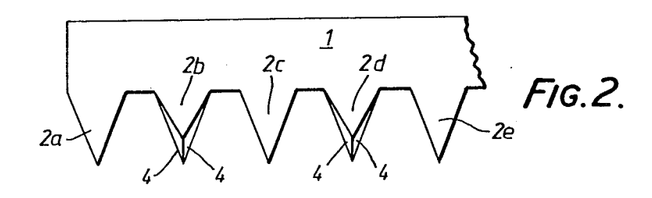
FIG. 2 is an end view of an enlarged scale in the direction of arrow A of FIG. 1.
Figure 3:
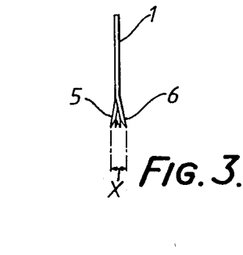
FIG. 3 is a side view on an enlarged scale of part of the first embodiment.

The first embodiment shown in FIGS. 1–3 consists of a single strip 1 formed with teeth 2 along its lower (as viewed in the drawings) edge. The right-hand (as viewed in FIG. 1) end portion of the strip 1 is of a reduced depth as compared with the remainder of the strip as indicated at 3. There are no teeth on the lower edge of the reduced depth portion The teeth 3 are of triangular form when seen in side view as in FIGS. 1 and 3, the bases of the triangles forming the roots of the teeth. The teeth are equi-spaced along the length of the strip. The sloping edges of all of the teeth are bevelled on one face thereof to form points at the tips of the teeth.

As can be implied from FIG. 3, the teeth are bevelled at 4 alternately on one face and then on the other. The unbevelled faces are plain. Additionally, certain adjacent teeth are set outwardly alternately in one direction or the other away from the plane containing the width of the strip. This is shown in FIG. 3, the set being indicated at 5 and 6. The set is such that the lateral distance between the tooth points of the outwardly set teeth, i.e. the distance X indicated in FIG. 3 is greater than the thickness of the strip 1 and of a blade support used to support the blade in a power saw as will be described below. Thus, and referring now to FIG. 2, the first tooth 2a from the left is set outwardly and is bevelled on that face not visible in FIG. 2 but is shown in FIG. 3. The next tooth 2b is also set but in a direction opposite to that of tooth 2a as can be seen from FIG. 2. Tooth 2b is also bevelled as indicated at 4 on the face that is visible in FIG. 2.

The next succeeding tooth 2c is not set and is bevelled on the face not visible in FIG. 2. The next succeeding tooth 2d is also not set and is bevelled as indicated at 4 on the face that is visible in FIG. 2.

The following tooth 2e is set outwardly in the same direction as the first tooth 2a and is also bevelled on that face not visible in FIG. 2 and so on.

The strip 1 is of a high carbon steel, for example a 1.0% carbon steel.

The saw blade shown in FIG. 1 has a thickness of about 0.70 mm, teeth of a dimension from root to point of about 5.0 mm, the included angle at the point being about 42°. The distance between the points of adjacent teeth is about 6.0 mm whilst the pitch is about 24 mm.

The tooth configuration of the embodiment shown in FIGS. 1–3 is suitable for general wood-cutting and may also be used to cut other materials. The location of the first of the teeth 2 at the extreme left-hand end of the strip 1 enables the blade to be used for "blind" cutting, i.e. a cut made into the surface of a material and which does not start at an edge thereof.

Figure 4:
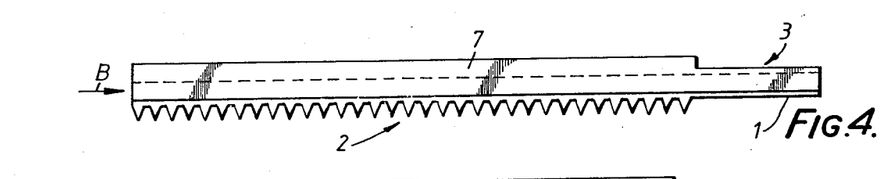
FIG. 4 is a side view of a second embodiment.
Figure 5:
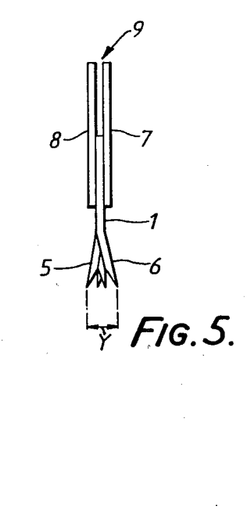
FIG. 5 is an end view on an enlarged scale in the direction of arrow B of FIG. 4.
Figure 6:
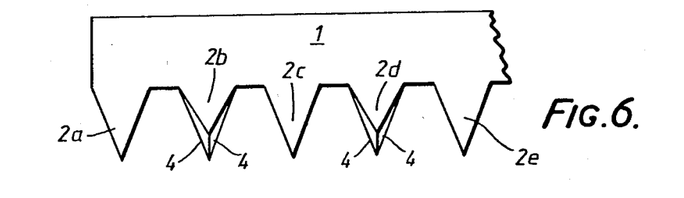
FIG. 6 is a side view on an enlarged scale of part of the second embodiment.

The second embodiment shown in FIGS. 4, 5 and 6 is identical with the first embodiment except that the strip 1 is sandwiched between two outer strips 7, 8 of a length equal to that of the strip 1 and, for convenience, of the same depth. The strips 7, 8, also of high carbon steel as above, are secured to the strip 1 by spot welding at similar positions which form a longitudinal channel 9 along the length of the strips. The weld spots are sufficiently close to eliminate any risk of the strips separating when in use. The strips 7, 8 have been omitted from FIG. 6.

Other materials than high carbon steel may be used provided they can be secured by spot welding if that method is to be used.

As in the first embodiment, certain of teeth 2 of the second embodiment are set outwardly. The set is such that the lateral distance between tooth points, i.e. the distance Y indicated in FIG. 2 is greater than the combined thickness of the strips 1, 7, 8 and greater than the thickness of a blade support used to support and guide the blade in a power saw as will be described below.

Thus, and referring to FIG. 6, the first tooth 2a of the teeth 2 is set outwardly, as indicated in FIG. 5, and is also bevelled on the face not visible in FIG. 6.

The next succeeding tooth 2b is set outwardly but in the opposite direction to tooth 2a as shown in FIG. 6 and is bevelled as indicated at 4 on the face visible in FIG. 6.

The next succeeding tooth 2c is not set and is bevelled on the face not visible in FIG. 6. The next succeeding tooth 2d is also not set and is bevelled as indicated at 4 on the face visible in FIG. 6.

Tooth 2e is similar to tooth 2a being set in the same direction and bevelled on that face not visible in FIG. 6, and so on.

The second embodiment is also suitable for general wood-cutting and may also be used to cut other materials. The location of the first tooth 2 at the extreme left-hand end of the strip 1 enables the embodiment to be used for "blind" cutting.

The strips 1 referred to above may be fabricated by stamping from flat strips after which the bevels may be formed by grinding. The off-setting of the teeth is carried out in the conventional manner.

The lamination construction of the second embodiment is preferred but it is possible to fabricate the blade from a single component. It is not essential that the strips 7, 8 be secured in place by spot welding, for example they may be secured by means of an industrial adhesive.

Furthermore, it is not essential that the strips 7, 8 be of the same thickness as strip 1.

Strips 1 are relatively thin as compared, for example with a jig saw blade, strength being provided by a blade support and guide.

The embodiments described above are suitable for use in a power saw as will be described below, the end portion 3 being clamped to a reciprocating drive member in the drive mechanism of the saw.

The embodiments are also suitable for use in a manual saw which may be a bow saw and which may incorporate a support and guide of the form described below and a handle by means of which the saw is held and operated.

Figure 7:
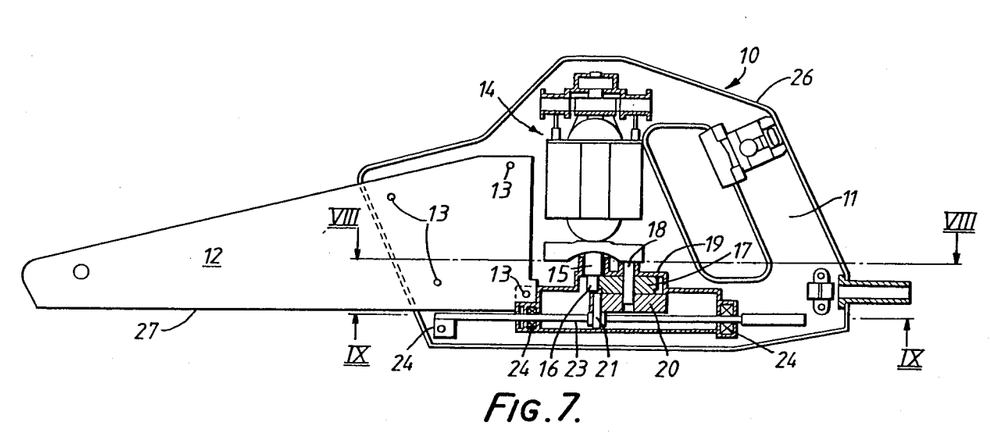
FIG. 7 is a side view in diagrammatic form only of a power saw with a housing part removed to reveal internal mechanism, certain other components also being removed.
Figure 8:
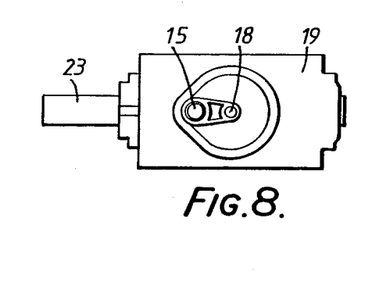
FIG. 8 is a part section on the line VIII—VIII of FIG. 7.
Figure 9:
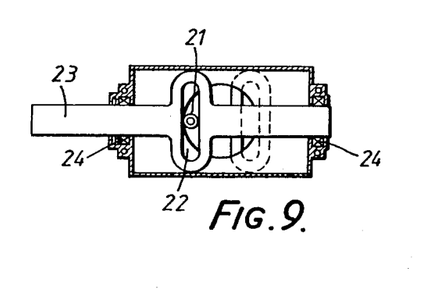
FIG. 9 is a part section on the line IX—IX of FIG. 7, FIGS. 10, 11, 12 and 13 are explanatory diagrams of alternative forms of support for saw blades/assemblies.

FIGS. 7, 8 and 9 show a power saw for use with the blade described above. The saw comprises a housing 10 of clam shell construction that provides a handle 11 and has a forwardly projecting blade support strip 12. The housing may also have a second handle adjacent the strip 12. The support 12 extends into the housing 10 and is secured in position at points 13.

The housing accommodates an electric driving motor 14 with an output shaft 15 whose lower end (as seen in FIG. 7) is formed as a pinion 16 meshing with a gear wheel 17 rotatably mounted upon a shaft 18 supported in the upper wall of a housing 19 formed between the clam shells. Secured to the gear wheel 17 is a disc 20 from which extends a driving pin 21 located towards the edge of the disc. The pin 21 engages a transverse slot 22 in an elongate drive member 23 mounted in bearings 24 for longitudinal reciprocatory movement.

The forward end of drive member 23 carries a clamp 24 by means of which the reduced width portion 3 of the saw blade can be secured to the member.

Energisation of motor 14 is controlled by a trigger-operates switch 26 located in handle 11, the necessary electrical connections being omitted from FIG. 7 for the sake of clarity.

Although not so shown in FIG. 7, the lower edge 27 of the support 12 is contoured as a guide surface for the saw blade and provides a channel in which locates the upper part of the strip 1 of the embodiment of FIGS. 1–3, or alternatively, a tongue that locates in the channel 9 of the embodiment of FIGS. 4–6.

Energisation of the motor 14 results in rapid to and fro movement of the drive member 23 as indicated by the limits in FIG. 9 and of the saw blade. A suitable speed of movement is about 3300 blade strokes per minute with an amplitude of about 40 mm. The amplitude is related to the tooth pitch of the saw blade and preferably the pitch should not exceed about 70%–85% of the amplitude of movement of the blade.

It is not essential that the saw blade be guided by the blade support in the manner described above.

Figure 10:
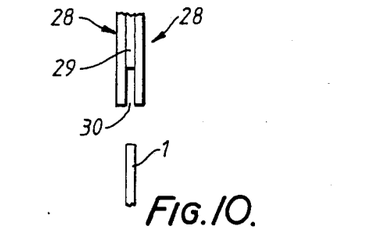

For example, the guide groove may be formed by adopting a laminar construction for the blade support. FIG. 10 shows such a laminar construction. Outer blade support members 28 are secured to an inner blade support 29 and extend downwardly beyond the latter to create a guide groove 30.

Figure 11:
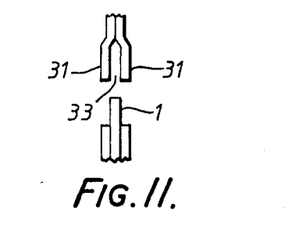

Alternatively, and as shown in FIG. 11, the blade support may comprise only two laminar members 31, 32 formed along their lower edges to create a guide channel 33.

Figure 12:
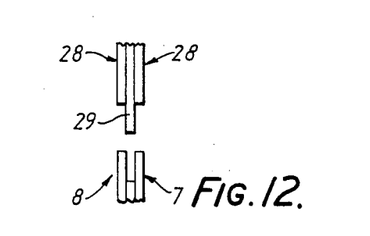

The laminated form of blade support may also be used to create a guide edge that locates in the gap 9 of the saw blade described above. Such a form is shown in FIG. 12.

Figure 13:
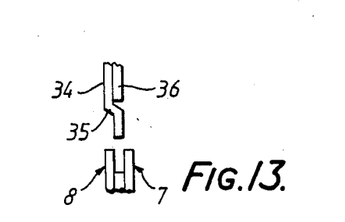

FIG. 13 shows a somewhat different form of blade support comprising two laminates, one of which 34 is upset along its lower edge as indicated at 35 to provide a longitudinal tongue located centrally of the other laminate 36.

It will be understood that the set of the saw blade teeth must be sufficient to exceed slightly the maximum overall thickness of the blade support irrespective of the precise form of the latter.

Figure 14:
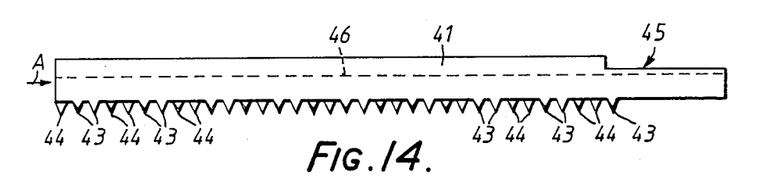
FIG. 14 is a side view of a third embodiment.
Figure 15:
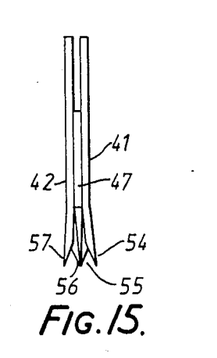
FIG. 15 is an end view in the direction of arrow A in FIG. 14 and on a larger scale.
Figure 16:
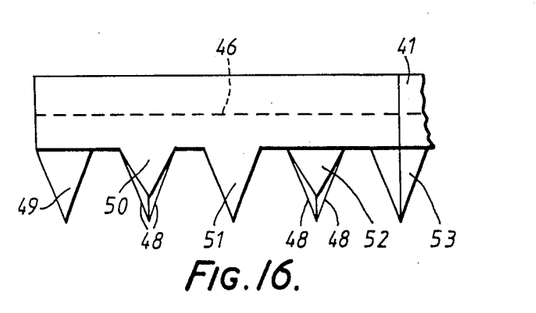
FIG. 16 is a side view on a larger scale of part of the embodiment of FIG. 14.

The saw blade assembly shown in FIGS. 14–16 comprises a laminated structure formed of two outer strips 41, 42 formed with teeth 43, 44 respectively along their lower (as viewed in FIG. 14) edges. The right-hand (as viewed in FIG. 14) end portions of the strips 41, 42 are of a reduced depth as compared with the remainder of the strips and as indicated at 45. There are no teeth along the lower edge of the reduced depth portions.

The outer strips 41, 42 are separated by an inner strip 46 whose depth is considerably less than that of the major parts of the strips 41, 42 and slightly less than the depth of the portions 45. The inner strip 46 is so located that its lower edge (as seen in FIGS. 14 and 15) is level with the roots of the teeth 43, 44 thus forming a longitudinal gap 47 between the upper parts of the strips 41, 42.

There is thus formed a saw blade assembly in which the roots of the teeth 43, 44 are spaced from one another laterally by the gap 47 equal to the thickness of the inner strip 46.

The teeth 43, 44 are of triangular form when seen in side elevation as in FIG. 14, the bases of the triangles forming the roots of the teeth. The teeth are arranged in pairs on each strip and the sloping edges are bevelled on their facing sides as indicated at 48 to form points at the tips of the teeth. Thus, the extreme left-hand tooth 49 shown in FIG. 16 is the first of the teeth 44. The next tooth 50 is the first of the teeth 43 and is bevelled on its outside face, the next tooth 51 is the second of the teeth 43 and is bevelled on its inside face. The next tooth 52 is second of the teeth 44 and is bevelled on its inside face whilst the next tooth 53 is the third of the teeth 44 and so on. The bevels taper towards the edges of the teeth as can be seen from FIG. 16.

Pairs of teeth on one strip locate centrally of the space between pairs of teeth on the other strip, the teeth being equi-spaced along the length of the assembly. That is to say, the distance between each pair of teeth is greater than that between the teeth of a pair.

Alternate ones of the teeth 43 are set outwardly as indicated at 54 in FIG. 15 whilst the others are set inwardly as indicated at 55. In similar manner, alternate teeth of teeth 44 are also set outwardly as indicated at 57 in FIG. 15, the remaining teeth being set inwardly as indicated at 56. Thus, in each pair of teeth, one tooth is bevelled on its inside face and set outwardly while the other tooth of the pair is bevelled on its outside face and set inwardly. The outward sets are sufficient to ensure that the tooth points lie externally of the faces of the outer strips 41, 42 as can be seen from FIG. 15 and externally of the faces of a support as will be described below.

In the form of blade assembly of the form shown in FIGS. 14, 15 and 16, the strips are of a thickness of about 0.7 mm and of a depth, as measured from the upper edge to the tooth points, of about 20 mm. The depth of each tooth as measured from root to point is about 5.0 mm. The depth of the slot 47 is about 6.0 mm.

The pitch of the teeth 43, 44 is about 24.0 mm. The first tooth of the teeth 43 lies at the left-hand end of strip 41 while the first tooth of teeth 44 is spaced from the left-hand end of strip 42 to give the tooth locations referred to above. At the other ends of the strips 41, 42, the extreme right-hand tooth is one of teeth 44. The included tip angle at the tooth point is about 42°.

The distance between adjacent teeth when the the assembly is viewed from the side is about 6.0 mm.

The tooth configuration of the assembly shown in FIGS. 14, 15 and 16 is suitable for general woodcutting operations in timber and may also be used to cut other materials.

Figures 17, 18, 19:
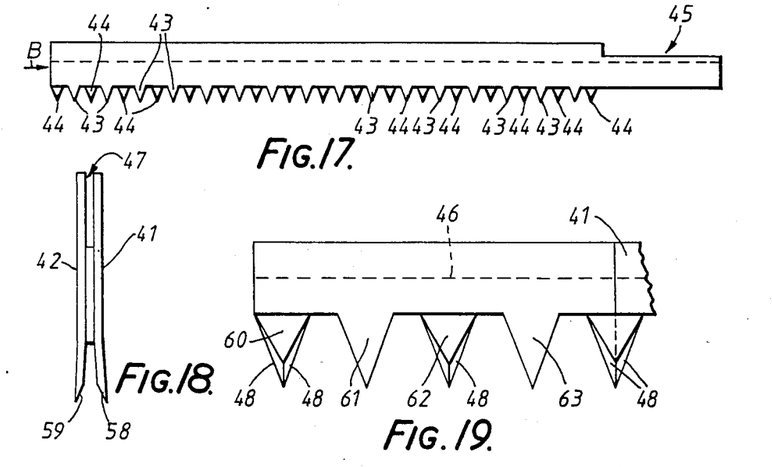
FIG. 17 is a side view of a fourth embodiment.
FIG. 18 is an end view in the direction of arrow B in FIG. 17 on a larger scale.
FIG. 19 is a side view on a larger scale of part of the embodiment of FIG. 17.

The fourth embodiment shown in FIGS. 17, 18 and 19 is generally similar to that shown in FIGS. 14, 15 and 16 and similar references are used. In the fourth embodiment, the teeth are arranged singly and each tooth on one strip lies centrally of the gap between adjacent teeth on the other strip. Further, all the teeth are bevelled on their inside faces to produce pointed tips, the outside faces being plain.

Additionally, all teeth on both strips are set outwardly as indicated at 58, 59 in FIG. 18, sufficiently to ensure that the tooth points lie externally of the outer strips and of the support as will be described below.

Thus, referring to FIG. 19, tooth 60 is the first of the teeth 44 and is bevelled at 48 on its inner face—that face visible in FIG. 19. Tooth 61 is the first of the teeth 43 and is also bevelled on its inner face (not visible). Tooth 62 is the second of the teeth 44, the bevelling 48 on the inner face being visible in FIG. 19. Tooth 63 is the second of the teeth 43 and is bevelled on its inner face (not visible), and so on.

The materials and dimensions of the assembly shown in FIGS. 17–19 are the same as those of the assembly of FIGS. 14–16 except that the tooth pitch is about 12.0 mm.

The embodiment of FIGS. 17–19 is particularly suitable for cross cutting timber.

Figure 20:
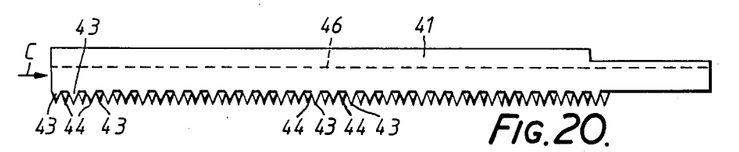
FIG. 20 is a side view of a fifth embodiment.
Figure 21:
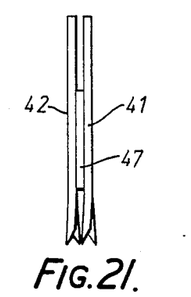
FIG. 21 is an end view in the direction of arrow C on FIG. 20 and on a larger scale.
Figure 22:
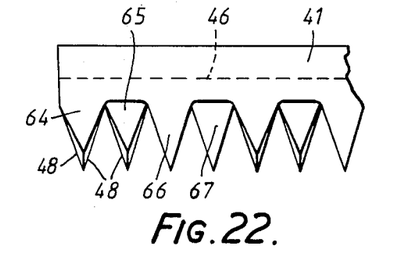
FIG. 22 is a side view on a larger scale of the part of the fifth embodiment.

The fifth embodiment shown in FIGS. 20–22 is suitable for fine cutting. In construction, it is similar to the embodiments already described but the tooth configuration is different. Again, similar references are used as in FIGS. 17–19.

Teeth on the same strip are alternately bevelled on inner and outer faces and set inwardly and outwardly. Thus, and as seen in FIG. 22, tooth 64 is the first tooth of teeth 43 and is bevelled at 48 on its outer face—the one visible in FIG. 22. Tooth 65 is the first tooth of teeth 44 and is bevelled at 48 on its inner face (also visible in FIG. 22). Tooth 66 is the second tooth of teeth 43 and is bevelled on its inner face (not visible). Tooth 67 is the second tooth of teeth 44 and is bevelled on its outer face (not visible). In all cases, the non-bevelled faces are plain.

Alternate ones of teeth 43 and of teeth 44 are set outwardly, the remainder being set inwardly. The setting can be seen in FIG. 21 and the outwards setting ensuring that the tooth points lie outside the outer strips and of the support as will be described below.

Each tooth of teeth 43 lies centrally of the gap between adjacent teeth of teeth 44 and vice versa.

The depth (i.e. the dimension from tooth root to tooth point) is about 5.0 mm and the tooth pitch is about 12.0 mm. The included angle and the point of the teeth is about 36°. Otherwise the dimensions of the blade assembly of FIGS. 20–22 are identical with those of the assembly of FIGS. 14–16 except that the spacing between successive teeth when the assembly is seen in side elevation is about 3.0 mm.

Figure 23:
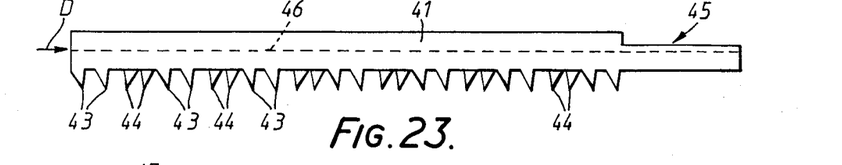
FIG. 23 is a side view of a sixth embodiment.
Figures 24, 25, 26:
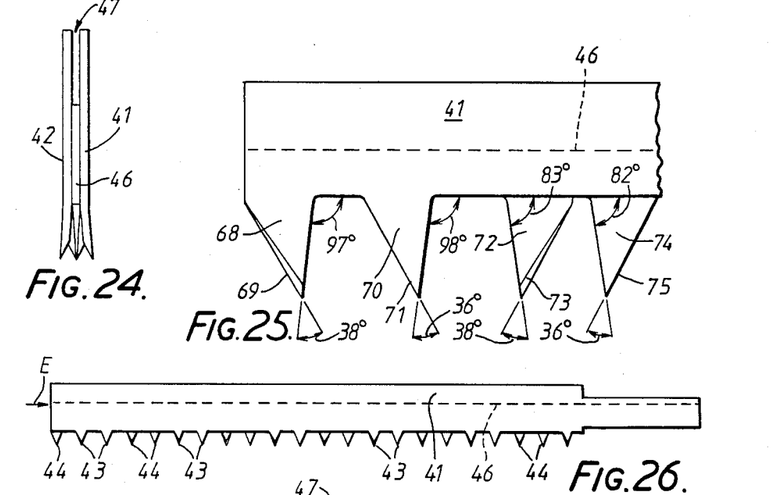
FIG. 24 is an end view in the direction of arrow D of FIG. 23 and on a larger scale.
FIG. 25 is a side view on a larger scale of a part of the sixth embodiment.
FIG. 26 is a side view of a seventh embodiment.

The sixth embodiment shown in FIGS. 23–25 is particularly suitable for coarse rip cutting.

The general construction of the assembly shown in FIGS. 23-25 is similar to that of the assembly shown in FIGS. 14-16 and similar references are used but the tooth contour and tooth pitch are different.

The teeth are arranged in pairs on each strip, the teeth of a pair being bevelled alternately on inner and outer faces on one edge only. The teeth of a pair are also set alternately inwardly and outwardly, the outward setting being as described above.

Thus, tooth 68 shown in FIG. 25 is the first of teeth 43 and is bevelled at 69 along the left-hand side only of the tooth on the inner face thereof—the face visible in FIG. 25. Tooth 70 is the second of teeth 43 and is bevelled along edge 71 on the inner face—the face not visible—thereof. Tooth 72 is the first of teeth 44 and is bevelled at 73 along the right-hand side only of the tooth on the inner face—the face visible in FIG. 25. Tooth 74 is the second of the teeth 44 and is bevelled along edge 74 on the inner face—the face not visible—of the tooth and so on.

In each case, the bevelling is such as to produce a pointed tip on the tooth.

As can be seen from FIGS. 23 and 25, the non bevelled edge of each tooth is inclined more steeply to the lower edge of the respective strip than is the bevelled edge, the inclination being slightly different for each tooth of a pair. In addition, the included angles at tooth tips are slightly different for each tooth of a pair.

Approximate value of the angles just referred to are given on FIG. 25. The tooth pitch is about 22 mm and each pair of teeth on one strip lies centrally of the gap between the pairs of teeth on the other strip, the arrangement producing a series of equi-spaced teeth along the length of the assembly. The distance between the teeth of each pair is about 8.00 mm while the distance from a tooth point to the upper edge of the assembly is about 20.0 mm. The tooth height from tip to root is about 7 mm.

Figure 27:
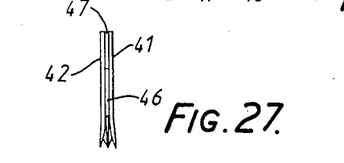
FIG. 27 is an end view in the direction of arrow E in FIG. 26 on an enlarged scale.
Figure 28:
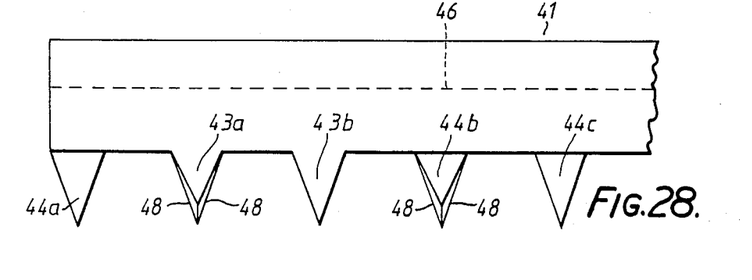
FIG. 28 is a side view on a larger scale of a part of the seventh embodiment.

The general construction of the assembly shown in FIGS. 26-28 is similar to that shown in FIGS. 14-16.

Outer strips 41, 42 with teeth 43, 44 along their lower edges (as seen in the drawings) are separated by an inner strip 46 dimensioned to leave a longitudinal gap 47 between the upper parts of the outer strips 41, 42.

The teeth on the strips 41, 42 are arranged in pairs and are arranged so that a pair on one strip lies centrally of the space between a pair on the other strip and so that seen in side view the teeth are equi-spaced along the length of the assembly.

The teeth are of triangular form when seen in side view and both edges of the triangle are bevelled to produce a pointed tip. In each pair of teeth, one is bevelled on its inside face and is set outwardly while the other tooth of the pair is bevelled on its outside face and is set inwardly. The other sides of the teeth are plain.

Thus, the first tooth 44a as seen in FIG. 28 is bevelled on its outside face (not visible) and is set inwardly. The second tooth 43a is bevelled at 48 on both edges on its outside face, i.e. the face visible in FIG. 28, and is set inwardly. The next tooth 43b is bevelled on its inside face (not visible) and is set outwardly. Teeth 43a and 43b form the first pair of the teeth 43.

The next succeeding tooth 44b is bevelled on its inside face (that visible in FIG. 28) and is set outwardly. The next succeeding tooth 44c forms a pair with tooth 44b and is bevelled on its inside face (not visible) and is set outwardly. The tooth pattern then repeats.

The tooth pitch of the seventh embodiment is about 36.0 mm while the apex angle of the teeth is about 40°. The dimensions are otherwise similar to those of the embodiment of FIGS. 14-16. The teeth are however more widely spaced, the distance between successive teeth when the assembly is seen in side view is about 6 mm.

In all the embodiments described above with reference to FIGS. 14-28, the strips 41, 42 and 46 are of a high carbon steel for example a 1.0% carbon steel. Other materials may be used provided they can be secured by spot welding if that method is to be used. Fabrication may comprise stamping from flat strip after which the bevels may be formed by grinding. The off-setting of the teeth is carried out in the conventional manner.

The laminated construction described is preferred, the laminations being secured together by spot welding along the length of the assembly. The spot welds are sufficiently close to eliminate any risk of the strips separating between the welds.

Other methods of securing the strips together may be used, for example, they may be secured together by means of an industrial adhesive.

It is not essential that the strips all be of the same thickness nor that a laminated construction be used. Fabrication from a one-piece strip may be used but this is expensive.

Alternatively, the inner strip may be formed from thickened portions on the adjacent faces of the outer strips.

The strips are relatively thin as compared, for example, with a jig-saw blade, the strength of the assembly being derived at least in part from the laminated construction and in part by the use of a blade assembly support and guide.

In alternative forms of the embodiments described above, smaller tooth spacing or pitches may be used such that there is a slight overlap of tooth roots along the length of the assembly.

The blade assemblies described above with reference to FIGS. 14-28 are suitable for use in a power saw as described above, the end portions 45 being clamped to a reciprocating drive member in the drive mechanism of the saw.

The assemblies are also suitable for use in a manual saw which may be a bow saw and which may incorporate a support and guide for the assembly as described below and a handle by which the saw is held and operated.

The gap between the roots of the teeth 43, 44 provides a space in which saw dust and chips can accumulate during use and this increases efficiency of cut. In addition, the location of a tooth closely adjacent the extreme left-hand or forward end of a strip allows the blade assembly to be used for "blind cutting", i.e. a cut made into the surface of work piece and which does not start at an edge thereof. If desired, each of the rows may have a tooth closely adjacent the extreme left-hand or forward end of the respective strip.

The set of the outwardly set teeth is such that the points of these teeth clear the thickness of the support guide of the power saw, i.e. they produce a saw cut of slightly greater width than the thickness of the support.

Energisation of the motor 40 described above results in rapid to and fro movement of the drive member 49 as indicated by the limits in FIG. 9 and of the saw blade assembly. A suitable speed of movement is about 3300 blade assembly strokes per minute with an amplitude of about 40 mm.

The amplitude is related to the tooth pitch of the saw blade assembly and preferably the pitch should not exceed about 70%–85% of the amplitude of movement of the assembly.

It is not essential that the saw blade assembly be guided by the blade support in the manner described above.

For example, the saw blade assembly may incorporate an inner strip that projects upwardly beyond the outer strips 41, 42 in a manner as shown in FIG. 10 and locate in a guide groove in the blade support.

The guide groove may be machined into a single piece blade support but can be created by adopting a laminar construction for the blade support similar to that shown above in FIG. 12. Outer blade support members are secured to an inner blade support member and extend downwardly beyond the latter to create a guide groove.

Alternatively, the blade support may incorporate only two laminar members formed along their lower edges to create a guide groove.

A somewhat different form of blade support may comprise two laminates, one of which is upset along its lower edge to provide a longitudinal tongue located centrally of the other laminate. The general arrangement is similar to that shown in FIG. 13 above.

Figure 29:
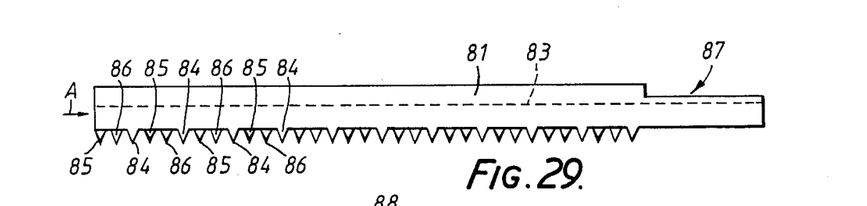
FIG. 29 is a side view of an eighth embodiment.
Figure 30:
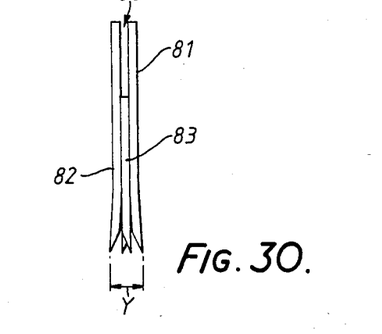
FIG. 30 is an end view in the direction of arrow A in FIG. 29, and on an enlarged scale.
Figure 31:
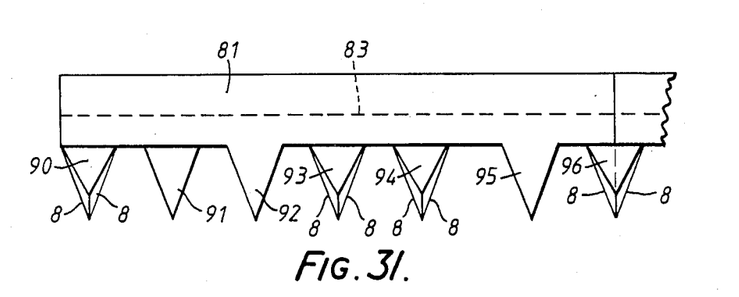
FIG. 31 is a side view of part of the eighth embodiment on a larger scale.

The saw blade assembly shown in FIGS. 29–31 comprises a laminated structure formed of two outer strips 81, 82 and an inner strip 83. The strips 81, 82 and 83 are formed along the greater length of their lower (as viewed in FIGS. 29–31) edges with teeth 84, 85, 86 respectively. The right-hand (as viewed in FIG. 29) ends of strips 81 and 82 are of a reduced depth as compared with the remainder of the strips and as indicated at 87. There are no teeth on the reduced depth portions.

The depth of the centre strip 83 is considerably less than that of the major parts of the strips 81, 82 and also of the portions 87 as indicated in FIG. 29. The inner strip 83 is so positioned relatively to the outer strips that there is formed a longitudinal groove 88 between the upper parts of the strips 81, 82.

The teeth 84, 85 and 86 are of triangular form when seen in side elevation as in FIGS. 29 and 31, the bases of the triangles forming the roots of the teeth. The sloping sides of the teeth are bevelled on one face only to form points at the tips of the teeth. The bevelling is shown more clearly in FIG. 31 and is referenced 89.

Referring now to FIG. 31, the extreme left-hand tooth 90 is the first tooth of the teeth 85 on outer strip 82 and is bevelled on its inner face as shown at 8, that is to say the face that faces teeth 84 and 86.

Tooth 91 is the first of the teeth 86 on the centre strip 83 and is bevelled only on that face that faces teeth 85.

Tooth 92 is the first of the teeth 84 on outer strip 81 and is bevelled only on the face that faces teeth 85 and 86, i.e. on its inner face.

Tooth 93 is the second tooth of the teeth 85 on the outer strip 82 and is also bevelled at 89 only on the face that faces teeth 84 and 86, i.e. on its inner face.

Tooth 94 is the second of the teeth 86 on the centre strip 83 and is bevelled only on the face that faces teeth 84 on outer strip 81.

Tooth 95 is the second of the teeth 84 on outer strip 81 and is also bevelled only on the face that faces teeth 85 and 86, i.e. on its inner face.

Tooth 96 is the third tooth of the teeth 85 of outer strip 82 and is also bevelled on its inner face.

The pattern just described continues along the length of the blade assembly. It will be appreciated that all the teeth 84 of outer strip 81 are bevelled only on the inner faces, that all the teeth 85 of outer strip 82 are also bevelled only on their inner faces, and that teeth 86 on the centre strip 83 are bevelled alternately on one face and then on the other. It is, however, possible to bevel all of the teeth 86 on the same faces.

In addition to the bevelling, teeth 84 and 85, i.e. the teeth on the outer strip 81, 82, are set outwardly by an amount that creates a lateral distance Y between the tooth points as shown in FIG. 30 that is greater than the thickness of the assembly. There is no set on the teeth 86.

When seen in side view as in FIGS. 29 and 31, the teeth 84, 85 and 86 appear equi-spaced along the length of the assembly.

The strips are of a thickness of about 0.70 mm and of a depth, as measured from the upper edge of the strip to the tooth points of about 20.0 mm. The depth of each tooth as measured from root to point is about 5.2 mm and the included angle at the tooth tip is about 42°. The depth of the groove 88 is about 6.5 mm.

The pitch of the teeth on each strip is about 36 mm, and the spacing between the adjacent teeth when the assembly is seen in side view is about 6.0 mm.

The tooth configuration described renders the assembly suitable for both cross and rip cutting in timber. The location of the first tooth of one of the strips at the extreme left-hand or forward end of the assembly also facilitates the use of the assembly for "blind" cutting, i.e. a cut made into a surface of a workpiece and which does not start at an edge thereof. Although difficult to fabricate, two or all of the strips may have teeth at the extreme left-hand or forward end.

In the embodiment described above with reference to FIGS. 29–31, the strips 81, 82 and 83 are of a high carbon steel, for example a 1.0% carbon steel. Fabrication may comprise stamping from flat strips after which the bevels may be formed by grinding. The off-setting of the teeth is carried out in the conventional manner.

The laminated constructions described above are preferred, the laminations being secured together by spot welding along the length of the assembly. The spot welds are sufficiently close to eliminate any risk of the strips separating between the welds.

Other methods of securing the strips together may be used, for example, they may be secured together by means of an industrial adhesive.

Other materials than high carbon steel may also be used provided such materials can be spot welded if that method is to be used.

It is not essential that the strips all be of the same thickness. The strips are relatively thin as compared, for example, with a jig-saw blade. The strength of the assembly is derived at least in part from the laminated construction and in part by the use of a blade assembly support and guide.

The blade assembly just described is suitable for use in a powered saw as will be described below, the end portions 87 being clamped to a reciprocating drive member in the drive mechanism of the powered saw. The assembly is also suitable for use in a manual saw which may be a bow saw and which may incorporate a support and guide for the blade assembly as described below and a handle by which the saw is held and operated.

The set of the outwardly set teeth is such that the points of the teeth clear the thickness of the support guide of the power saw, i.e. they produce a saw cut of slightly greater width than the thickness of the support guide.

Energisation of the motor of the power saw results in rapid to and fro movement of the saw blade assembly. A suitable speed of movement is about 3300 blade assembly strokes per minute with an amplitude of about 40 mm.

The amplitude is related to the tooth pitch and preferably the pitch should not exceed about 70%–85% of the amplitude of movement of the saw blade assembly.

It is not essential that the saw blade assembly described above with reference to FIGS. 29–31 be guided by the blade support in the manner described above.

For example, the saw blade assembly may incorporate a centre strip that projects upwardly beyond the outer strips 81, 82 similar to that shown in FIG. 10 and which locates in a guide groove 36 in a blade support.

The guide groove may be machined into a single piece blade support but preferably is created by adopting a laminar construction for the blade support. FIG. 11 shows such a laminar construction. Outer blade support members are secured to an inner blade support member whose lower edge terminates above that of the outer members to create the groove.

A laminated blade assembly support is also shown in FIG. 12 but in this case the inner member of the support extends beyond the outer members to create a tongue that locates in the groove of the saw blade assembly.

Alternatively, and as shown in FIG. 13, the blade support may incorporate only two laminar members contoured along their lower edges to create a guide groove in which locates a projecting part of the centre strip of the saw blade assembly.

FIG. 13 shows a somewhat different form of blade support that can also be used. It comprises two laminates, one which is upset along its lower edge to provide a longitudinal tongue located centrally of the other laminate.

It will be appreciated that other forms of drive than that described above may be used to reciprocate the saw blade assembly.

What is claimed is:

1. A saw blade assembly comprising a laminated structure including two outer parallel strips each having formed along one edge thereof a row of spaced saw teeth extending longitudinally of the assembly, such that the roots of the teeth in the row on one of said outer strips are laterally spaced from the roots of the teeth in the row on the other of said outer strips, and an inner spacer strip extending longitudinally between said two outer strips and permanently affixed on its opposite sides to said two outer strips such that the thickness of said inner spacer strip determines said lateral spacing, said inner spacer strip extending to but not beyond the base of the roots of said row of teeth on said two outer strips.

2. The saw blade assembly of claim 1 wherein said outer strips are affixed to said inner strip such that the longitudinal spacing of said rows of teeth on said two outer strips is substantially uniform along the entire portion of the assembly containing said teeth.

3. An assembly as claimed in claim 1 in which some at least of the teeth in each row are set outwardly.

4. An assembly as claimed in claim 3 in which the remaining teeth in the rows are set inwardly.

5. An assembly as claimed in claim 1 in which the teeth in each row are arranged in pairs along the length of the assembly, each pair being separated from the next pair by a distance greater than that between the teeth of a pair.

6. An assembly as claimed in claim 5 in which one tooth in a pair is bevelled on its inside face and set outwardly, the other tooth in the pair being bevelled on its outside face and set inwardly.

7. The saw blade assembly of claim 6 wherein the teeth in the row on said one outer strip are bevelled along their leading edges only and the teeth in the row on said other outer strip are bevelled along their trailing edges only.

8. The saw blade assembly of claim 5 wherein each pair of teeth (except for an end pair) in the row on said one outer strip is longitudinally interspersed between succesive pairs of teeth in the row on said other outer strip, and each pair of teeth (except for an end pair) in the row on said other outer strip is longitudinally interspersed between successive pairs of teeth in the row on said one outer strip.

9. The saw blade assembly of claim 8 wherein each pair of teeth (except for an end pair) in the row on said one outer strip is longitudinally spaced an unequal distance between the adjoining successive pairs of teeth in the row on said other outer strip.

10. An assembly as claimed in claim 1 in which the inner strip is dimensioned to provide a longitudinal guide.

* * * * *